April 6, 1937.  A. L. BERRY  2,076,441
MOISTURE TESTER AND METHOD
Filed Sept. 2, 1930  2 Sheets-Sheet 1

Inventor
Albert L. Berry,
By Riordan & Riordan
Attorney

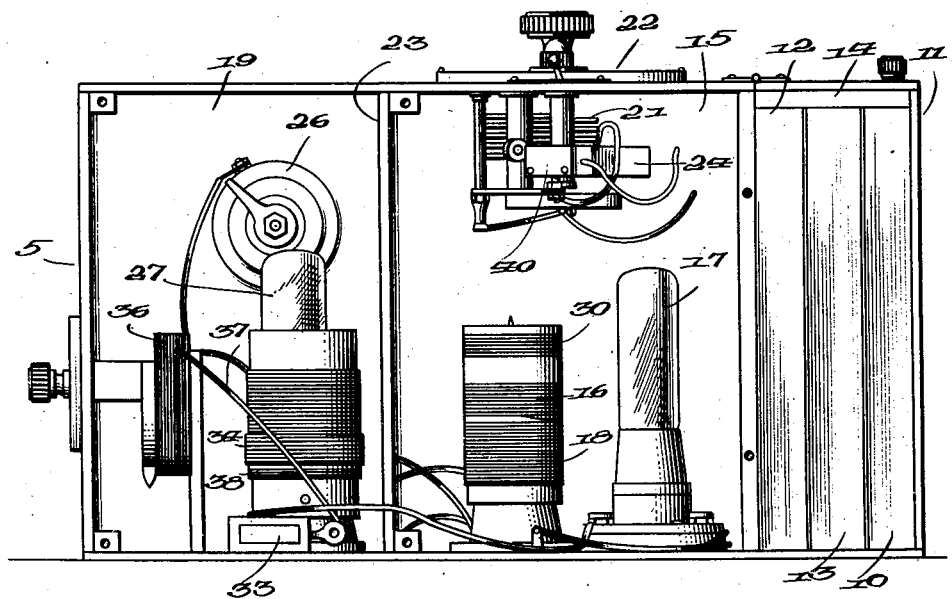
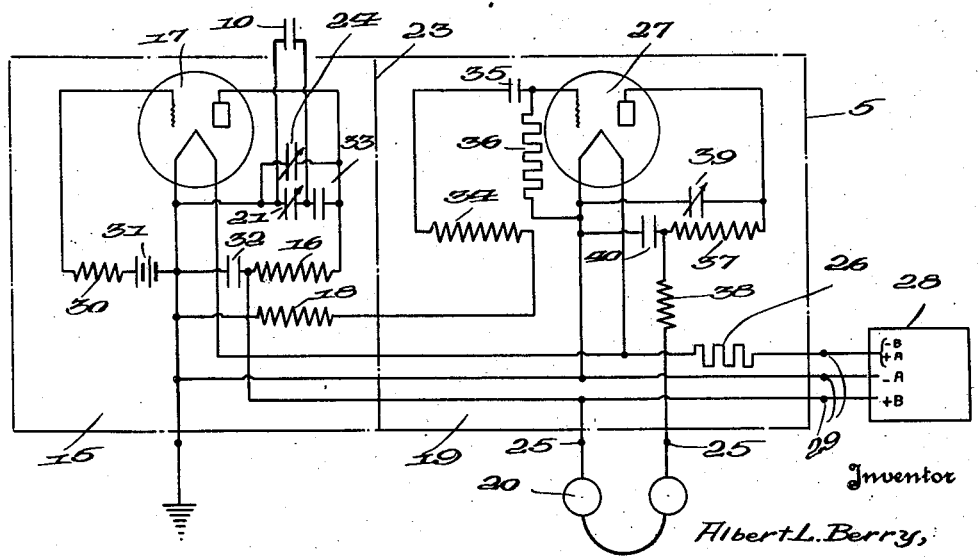

Patented Apr. 6, 1937

2,076,441

UNITED STATES PATENT OFFICE 2,076,441

MOISTURE TESTER AND METHOD

Albert L. Berry, Salina, Kans.

Application September 2, 1930, Serial No. 479,385

12 Claims. (Cl. 175—183)

The present invention relates to the measurement and control of moisture content in material such as grain, grain products, beans, hay, lumber or other forest products, or any other material which is hygroscopic in character. The invention also contemplates determinations of butter fat in dairy products and the determination of oil percentages in liquids and solids, and also the determination of proportions of any two subsances combined in liquids or solids, which have a difference in di-electric constant.

It is a feature of the invention that the method and apparatus may be utilized for measuring the moisture content of fluent material, such as grain, grain products, dairy products and various liquids by utilizing those di-electric properties of such materials, as bear a direct relation to the moisture content of the material and by measuring variations in such electrical characteristics.

Standard methods and apparatus now in use for the measurement of the moisture content of such material involve considerable labor and necessitate time and great care in the procedure, to obtain even reasonably accurate results.

The method and apparatus hereinafter disclosed, for the determination of moisture, of such hygroscopic material, and especially grain and grain products, makes use of the change in di-electric properties of the material in accordance with variations in the amount of moisture content, that is to say, the determinations are based on differences of di-electric constants.

Such method and apparatus have a wide field of utility, and may be used for weighing or measuring samples of uniform material, determining proportions therein, etc.

One di-electric property of these materials, which is utilized, is the specific inductive capacity or the "di-electric constant" of such material. This "constant" varies greatly as the moisture content thereof varies, that is, the specific, inductive capacity is a function of the moisture content of such material and bears direct relation to the moisture content.

It is known that the di-electric constant of most dry materials is usually between 2.0 and 6.0 while the di-electric constant of water is 81.0 and it will readily be seen that slight variations in the composition of the material other than water, will cause but a slight variation in the specific inductive capacity or di-electric constant thereof, since the component materials, other than water, will have a di-electric constant usually between 2.0 and 6.0. Water, however, having a di-electric constant of around 81.0 will change the di-electric constant of a material greatly even if no other changes take place in the material other than the substitution of some moisture in place of some of the dry material. The changes inside the material which take place are not as simple as this, and the di-electric constant of the material bears a complicated relation to its moisture content, but it changes greatly with the amount of moisture content. In wheat, for instance, there is approximately a 3 to 1 change in di-electric constant for only a ten percent change in moisture at ordinary values of moisture content.

In practicing the methods of this invention, use is made of this change in di-electric constant of the material with change in moisture content, or use is made of a relation existing between the di-electric constant of the material and the amount of moisture content of the material to accurately determine the amount of moisture in the material.

The capacity of an electrical condenser or capacitor, is proportional to the di-electric constant or specific inductive capacity of the di-electric between the plates, other things being equal, and the di-electric constant of the material may be defined as the ratio of the capacity of an electrical condenser or capacitor, with that material as the di-electric, to its capacity with dry air or a vacuum as the di-electric.

A method then of determining the capacity of a condenser or its effect upon an electric circuit, with a material whose percentage of moisture is to be measured, used as a di-electric in the electric field of the condenser or capacitor may be used to determine or indicate the percentage of moisture content of said material. It is known that the di-electric properties of the material will change with the amount of moisture content of said material, but these di-electric properties, which bear a relation to the moisture content of the material have never been measured or utilized as a measure of the amount of moisture content except when such material is hygrometric in character or is capable of quickly and readily absorbing moisture from some other material nearby, confined with and in an air chamber or exposed to the influence of the percentage of moisture in some other material, said other material being that whose moisture content is to be measured or determined.

In order that the method and apparatus for accomplishing these measurements may be more clearly understood reference may be made to the following description and the accompanying drawings, in which:—

Fig. 3 is a sectional elevation showing an arrangement of parts; and

Fig. 4 is a schematic wiring diagram illustrating the electric circuit.

Figure 1:
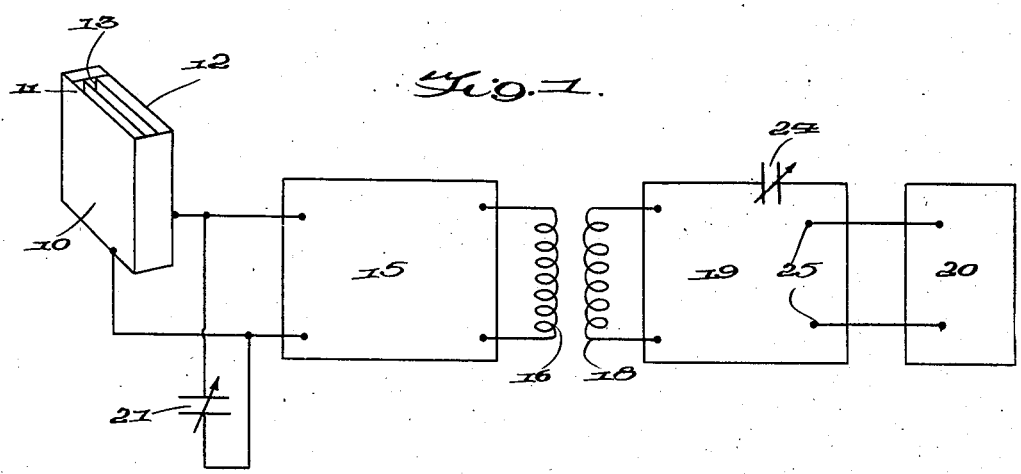
Fig. 1 is a diagrammatic layout showing the essential units of the apparatus.
Figure 2:
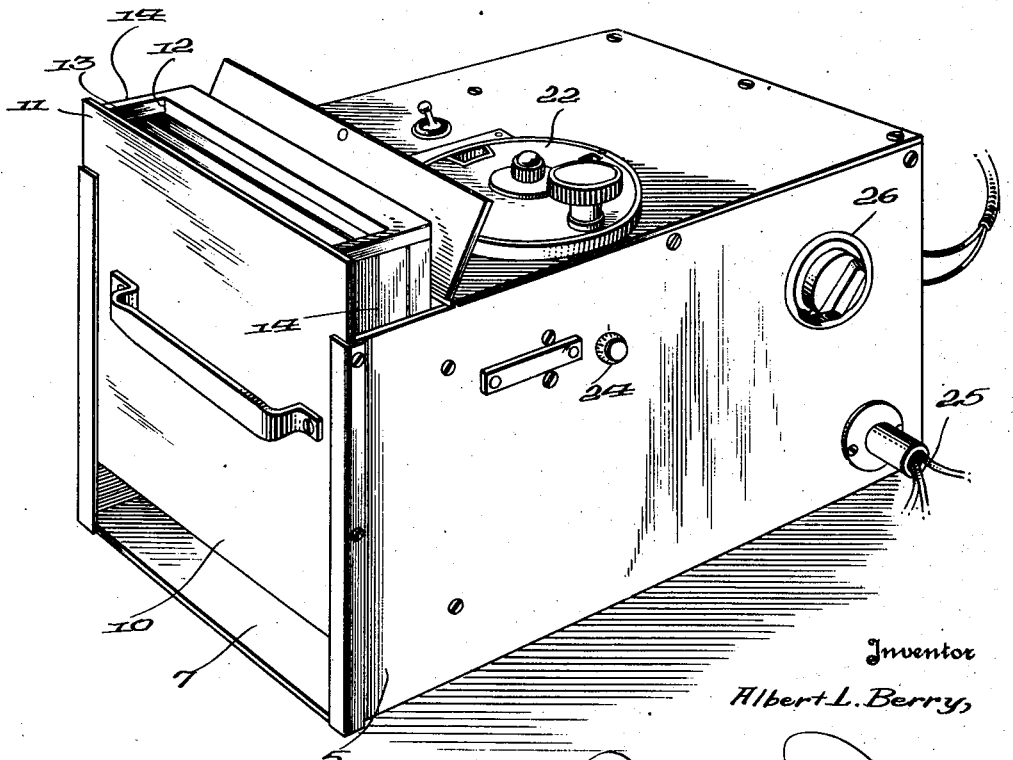
Fig. 2 is a perspective view of the apparatus.

Referring more specifically to the drawings, in which like figures designate like parts, it will be observed that the apparatus comprises generally a metal cabinet or container 5 which acts to house two high frequency current generators 15 and 19 separated from each other by a metal partition 23, which acts as a shield to prevent the generators from reacting upon each other in such a manner as to disturb calibrated adjustments, and the accuracy of the device, the cabinet 5 being provided with a recess 7 at one end thereof adapted to house a condenser 10 in the form of a receptacle or box, which is adapted to receive the sample of material to be tested. A suitable power supply 28, such as batteries, or a power pack, or suitable device effective to rectify current from a suitable lighting source, is connected by means of terminals 29 to the cabinet 5 and an acoustic device 20, such as a pair of head-phones or loud speaker is connected by terminals 25 to the circuits of generator 19.

The generators 15 and 19 include three element vacuum tubes 17 and 27 respectively, in generative circuits, to function as generators of high frequency currents.

The condenser 10, when placed in the recess 7, will be connected into the circuit of generator 15 and will act to partly control the frequency thereof.

The condenser 10 is provided with three plates, the two outside plates 11 and 12 being extended above the center plate 13. Plates 11 and 12 may be connected together to function as the low potential side of the condenser, the plate 13 acting as the high potential side of the condenser thus formed.

The plates are supported by end members 14 and a bottom portion (not shown) and with the ends and bottom forming a box into which the material to be tested may be placed. These connecting portions will be formed of moisture-proof insulating material.

The generator 15 includes a coil 16 located in the plate circuit of the vacuum tube 17, and a coupling coil 18, inductively coupled to the coil 16. Coil 18 is connected in a secondary oscillating circuit of the high frequency generator and detector 19, which in turn is connected to the speaker 20, the purpose of the speaker being to give acoustical indications to the operator of the device when a calibrated variable capacity condenser 21 in the circuit of generator 15, is adjusted to a value which will compensate for characteristics of the condenser 10, which are affected by the amount of moisture content of the di-electric between the plates of the condenser 10.

A dial 22 suitably calibrated in terms of moisture percentage, weight, or any preferred indicia, is attached to the condenser 21, to indicate, when properly adjusted, the amount of moisture content of the material in the box condenser 10. Generator 15 also includes a variable condenser 24 in its tuning circuit, for the purpose of regulating the frequency thereof, to some known predetermined frequency when the box condenser 10 is placed in the recess or compartment provided therefor in the cabinet 5. This adjustment will be made with box condenser empty, said known predetermined frequency being one half the frequency of the generator at 19. Making the frequency of the generator at 15, half of the frequency of the generator 19 instead of the same frequency, reduces the tendency of the two generators to synchronize with each other and thereby make possible a more accurate adjustment of the dial 22.

The head-phones or loud speaker unit 20 are connected by terminals 25 in the circuit of the generator 19 to give an acoustical or audible note, the frequency of which is the difference between the frequency of generator 19 and twice the fundamental frequency of generator 15.

26 is a variable resistance in the filament circuits of vacuum tubes 17 and 27, for the purpose of regulating the current therein.

The generator 15 includes a coil 30, used to couple the grid of the vacuum tube 17 inductively to the plate coil 16 of said tube, a bias battery 31, a high frequency by-pass condenser 32, a D. C. blocking condenser 33 to prevent high direct current voltage from being applied to condensers 10 and 21.

The inductance of coil 16 and the combined capacities of condensers 10, 21, 24 and 33 are the major factors which determine the frequency at which the circuits of generator 15 oscillate. Condenser 24 is adjusted and left at that fixed adjustment, while condenser 33 is a fixed capacity condenser. When the capacity of the condenser 10 is changed by a change in the amount of moisture content of the material placed between its plates or when it is changed by emptying the box of such material, or when empty, by filling it with such material condenser 21 is adjusted so that the combined capacity of the condensers 10, 21, 24 and 33 remains unchanged, therefore the frequency of generator 15 remains unchanged. The coupling coil 18 being inductively coupled to coil 16, is used to supply voltage whose frequency is the same as the frequency of generator 15 to the grid of vacuum tube 27. In series with the coil 18 is a grid coil 34, used to couple the grid of tube 27 inductively to the plate of said tube thereby causing it to oscillate. Generator 19 will include a grid condenser 35 used in combination with the resistor 36 in the grid circuit of tube 27 to limit the amount of direct current through the phones or speaker 20 and make tube 27 act as a detector. The coils 37 and 38 are also used to make the tube act as an oscillating detector to detect the signal received through the coil 16 from generator 15, whereby to produce in the phones an audible heterodyne note by virtue of said oscillation and detection. The frequency of the generator 19 is regulated by the adjustable condenser 39. The plate coil 37 in the circuit of generator 19 forms an inductance which in combination with the capacity of condenser 39 determines to a large extent the frequency of oscillation of generator 19. The inductance coil 38 suppresses high frequency currents and prevents them from flowing through the acoustical device 20. 40 is a by-pass condenser which passes high frequency currents.

Having thus described my invention, and one preferred embodiment or arrangement of certain units, the use thereof and the method contemplated herein will be apparent. The condensers 21, 24 and 39 are adjusted to place the circuits of generator 15 in resonance at some frequency these adjustments being made with the box condenser 10 empty. This condenser 10 is then filled with the material whose moisture content is to be measured the center plate 13 being well covered. The material thus placed in the box supplants the air di-electric between plates 11, 12 and 13, and changes the capacity of the condenser, consequently affecting the frequency of generator 15. With the condensers 24 and 39 unchanged the condenser 21 will be adjusted until the circuits are once more in resonance at the same frequency and inasmuch as the dial 22 of this last condenser is suitably calibrated a reading may be taken which will indicate the moisture content. In other words, the difference between the fixed or known setting originally made and the setting of dial 22 subsequently obtained determines the amount of moisture content in a given material.

The foregoing are but suggested ways of using the described apparatus others having been suggested throughout the specification.

It will be evident to those skilled in the art that various arrangements may be used and modifications may be made without departing from the spirit or scope of this disclosure, and I do not intend to be limited, either to circuit or mechanical arrangement, except as defined and described in the appended claims, but I intend to cover in its broader sense the arrangement and method of determining the capacity as dependent upon or bearing relation to the moisture content or percentage of moisture in the di-electric of said condenser, such di-electric being the material whose moisture content is to be determined.

I intend to distinguish between known devices wherein moisture content is determined by influence of the moisture content of one material upon another material, which is hygrometric or highly hygroscopic in character, and which latter material is capable of quickly absorbing or giving off moisture in proportion to the amount of moisture content of the material to be measured and using this hygrometric material to form the di-electric of the condenser, whose characteristics are affected by a change in the di-electric properties of the hygrometric material due to the fact that the properties of said material bear a relation to its own moisture content and thereby bear some relation and are influenced by the moisture content of the nearby material, said nearby material being that whose amount of moisture content is to be measured, and my invention wherein the material to be measured is used as the di-electric placed in the electric field of a condenser thereby to affect the characteristics of the condenser, said characteristics being measured to determine the percentage of moisture in the di-electric material.

The term "fluent material" is used herein, and in the appended claims, in a manner conventionally understood in the art, and is intended to means any material capable of flowing, as in a grain stream, and not intended as limited to liquids, or like fluids.

Having thus described my invention, what I claim as new and desire to secure by Letters Patent of the United States, is:—

1. In a device for determining the amount of moisture content of a material, the combination of a self-oscillating electric circuit, a fixed condenser of known capacity in said circuit, and means to obtain a definite frequency of oscillation in said circuit, and said capacitor being in the form of a box and having for its plates, wall portions of the box, whereby the material to be measured may be utilized for the di-electric of said condenser, and the di-electric properties of said material utilized to modify the characteristics of said condenser and thereby modify the constants of said electric circuit to change the frequency of oscillation, and means to measure the change of frequency.

2. In a device for determining the amount of moisture content of a fluent material, the combination of a tuned electrical circuit, a normally fixed condenser therein, said condenser being in the form of a box and having for its plates, wall portions of the box, whereby the material to be measured may be utilized as a di-electric for said fixed condenser thereby to affect the frequency at which said circuit oscillates, and means to measure the change in frequency, thereby to obtain an indication of the moisture content of the material.

3. In a device for determining the amount of moisture content of a fluent material, the combination of a tuned electrical circuit, a normally fixed condenser therein, and a variable condenser in said circuit, said condenser being in the form of a box and having for its plates, wall portions of the box, whereby the material to be measured may be utilized as a di-electric for said fixed condenser thereby to effect the frequency at which said circuit oscillates, said variable condenser being calibrated in terms of the moisture content of the material which is used as the di-electric in the electric field of said fixed condenser.

4. In a device for determining the amount of moisture content of a fluent material, the combination of a tuned electrical circuit, a normally fixed capacitor of pre-determined known capacity therein, and a calibrated adjustable capacitor in said circuit, said condenser being in the form of a box and having for its plates, wall portions of the box, whereby the material to be measured may be utilized as a di-electric for said fixed capacitor thereby to effect the frequency at which said circuit oscillates, means including said adjustable capacitor to counteract the effect of said fixed capacitor and to determine when the effects of said fixed capacitor with said material as a di-electric, have been counteracted by said calibrated adjustable capacitor, the calibration of said adjustable capacitor being effective to indicate the amount of moisture content of the material.

5. In a device for determining the amount of moisture content of a material, the combination of a plurality of self-oscillating electrical circuits, one of which has a constant frequency and the other having a variable frequency, said last-named circuit including a calibrated variable condenser and a condenser whose capacity may be affected by those di-electric properties of the material whose moisture content is to be determined, means to substitute said material for the di-electric of said last condenser thereby to vary the frequency of said last named circuit, means including said calibrated condenser to make the frequency again bear a known relation to that of the first named circuit, thereby to determine by the settings of the variable condenser, the amount of moisture content of the material, the constant frequency of said first circuit being used as a standard by which the calibrated condenser may be adjusted to make the frequencies of the associated circuit bear a known predetermined and constant relation to the standard frequency.

6. A method of determining the amount of moisture content of a material which comprises coupling two self-oscillating circuits and synchronizing the frequencies thereof, utilizing those di-electric properties of the material which bear a relation to the moisture content to affect the frequency of one of said circuits, thereby producing a beat or heterodyne frequency between the two circuits, the frequency of which is the difference in frequency of oscillation of the two circuits, reproducing acoustically an audible signal by means of the heterodyne frequency, tuning the affected circuit to counteract the effect of the di-electric properties of said material and measuring the amount of tuning required as an indication of the amount of moisture content of the material being used as the di-electric of a condenser being formed as a box in which said material may be placed.

7. In a device for determining the amount of moisture content of a material, the combination of a plurality of self-oscillating electrical circuits, one of which has a constant frequency and the other having a variable frequency, said last named circuit including a calibrated variable condenser and a condenser whose capacity may be affected by those di-electric properties of the material whose moisture content is to be determined, means to substitute said material for the di-electric of said last condenser thereby to vary the frequency of said last named circuit, means including said calibrated condenser to place the new frequency in synchronism with that of the first named circuit, thereby to determine, by the settings of the variable condenser, the amount of moisture content of the material, the constant frequency of said first circuit being used as a standard by which the calibrated condenser may be adjusted to make the frequencies of the associated circuit bear a known predetermined and constant relation to the standard frequency, said device, including the condenser, being housed in a metal cabinet effective to form an electrostatic shield.

8. In a device of the character described, a condenser in the form of a box comprising a plurality of conducting plates one of which forms a side of the box and another of which provides a compartment therein for holding a given amount of a material to be tested, means to determine the characteristics of said condenser, and means to determine the variation of such characteristics when the material is placed within the box and between the plates thereof, thereby to determine the amount of moisture content of the material.

9. In a device of the character described, a condenser in the form of a box, comprising a plurality of conducting plates forming the sides of the box, certain of said plates being electrically connected at one potential and forming compartments with others of said plates for holding a given amount of a material to be tested between the plates of the condenser, means to determine the characteristics of said condenser, and means to indicate a variation of such characteristics when the material is placed within the box and completely covers the last mentioned plates thereby to determine the amount of moisture content of the material.

10. In a device for determining the amount of moisture content of a material, a plurality of regenerative electric circuits effective to generate high frequency currents, means to change the frequency of one of said circuits relative to the other comprising a condenser in the form of a box having for its plates, wall portions of the box, and having a removable di-electric including the material to be tested, and means to indicate the degree of change in frequency when the di-electric is removed, thereby to determine the amount of moisture content of the material.

11. A device for determining the amount of moisture content of a material, comprising a metal cabinet, compartments formed in said cabinet, a high frequency generator including a regenerative electric circuit housed in one of said compartments, a second high frequency generator including a regenerative electric circuit housed in the other of said compartments, and means to change the frequency of one of said generators and its circuits comprising a condenser of known fixed capacity, in the form of a box having for its plates, wall portions of the box, means to removably mount said condenser in said cabinet adjacent one of said compartments, said box condenser being effective to receive the material to be tested thereby varying the capacity of the condenser, and means to indicate the change in frequency when the capacity of the condenser is varied thereby to determine the amount of moisture content of the material forming the new di-electric.

12. In a device of the character described, a metal cabinet, compartments formed in said cabinet, a high frequency generator including a regenerative electric circuit housed in one of said compartments, a second high frequency generator including a regenerative electric circuit housed in the other of said compartments, and means to change the frequency of one of said generators and its circuits comprising a condenser of known fixed capacity, in the form of a box having for its plates, wall portions of the box, means to removably mount said condenser in said cabinet adjacent one of said compartments, said box condenser being effective to receive selectively di-electric materials of relatively variable characteristics, thereby to vary the capacity of the condenser in accordance with the selected material, and means to indicate the change in frequency when the capacity of the condenser is varied.

ALBERT L. BERRY.